United States Patent
Chakraborty et al.

(10) Patent No.: US 11,971,955 B1
(45) Date of Patent: Apr. 30, 2024

(54) EXAMPLE-BASED IMAGE ANNOTATION

(71) Applicant: Amazon Technologies, Inc., Seattle, WA (US)

(72) Inventors: Ria Chakraborty, Howrah (IN); Madhur Popli, Ludhiana (IN); Rachit Lamba, Delhi (IN); Santosh Kumar Sahu, Bangalore (IN); Rishi Kishore Verma, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 406 days.

(21) Appl. No.: 17/381,833

(22) Filed: Jul. 21, 2021

(51) Int. Cl.
| | |
|---|---|
| G06V 10/00 | (2022.01) |
| G06F 18/21 | (2023.01) |
| G06F 18/214 | (2023.01) |
| G06F 18/22 | (2023.01) |
| G06F 18/2413 | (2023.01) |
| G06F 18/40 | (2023.01) |
| G06N 3/04 | (2023.01) |
| G06N 3/08 | (2023.01) |
| G06T 7/73 | (2017.01) |
| G06V 10/75 | (2022.01) |
| G06F 3/0482 | (2013.01) |

(52) U.S. Cl.
CPC ...... *G06F 18/2148* (2023.01); *G06F 18/2155* (2023.01); *G06F 18/2163* (2023.01); *G06F 18/2178* (2023.01); *G06F 18/22* (2023.01); *G06F 18/2413* (2023.01); *G06F 18/40* (2023.01); *G06N 3/04* (2013.01); *G06N 3/08* (2013.01); *G06T 7/73* (2017.01); *G06V 10/751* (2022.01); *G06F 3/0482* (2013.01); *G06T 2207/20081* (2013.01); *G06T 2207/20084* (2013.01); *G06V 2201/09* (2022.01)

(58) Field of Classification Search
CPC .. G06F 18/2148; G06F 18/2178; G06F 18/22; G06F 18/2163; G06F 18/40; G06F 18/2155; G06F 3/0482; G06T 7/73; G06T 2207/20081; G06T 2207/20084; G06V 10/751; G06V 2201/09; G06N 3/08; G06N 3/0454; G06N 3/082
See application file for complete search history.

(56) References Cited

U.S. PATENT DOCUMENTS

| | | | | |
|---|---|---|---|---|
| 10,860,836 | B1 * | 12/2020 | Tyagi | G06N 3/084 |
| 11,106,903 | B1 * | 8/2021 | Huynh | G06V 10/82 |
| 2018/0114099 | A1 * | 4/2018 | Desai | G06F 18/2178 |
| 2019/0156202 | A1 * | 5/2019 | Falk | G06N 3/045 |
| 2021/0241035 | A1 * | 8/2021 | Sutherland | G06V 10/7784 |

(Continued)

*Primary Examiner* — Amir Alavi
(74) *Attorney, Agent, or Firm* — K&L Gates

(57) ABSTRACT

Techniques are generally described for machine learning exampled-based annotation of image data. In some examples, a first machine learning model may receive a query image comprising a first depiction of an object-of-interest. In some examples, the first machine learning model may receive a target image representing a scene in which a second depiction of the object-of-interest is visually represented. In various examples, the first machine learning model may generate annotated output image data that identifies a location of the second depiction of the object-of-interest within the target image. In some examples, an object detection model may be trained based at least in part on the annotated output image data.

20 Claims, 9 Drawing Sheets

(56) References Cited

U.S. PATENT DOCUMENTS

| | | | |
|---|---|---|---|
| 2021/0295155 A1* | 9/2021 | Vijayakumar | G06V 10/774 |
| 2022/0083907 A1* | 3/2022 | Singh | G06N 20/00 |
| 2022/0147738 A1* | 5/2022 | Huang | G06T 7/73 |
| 2022/0253630 A1* | 8/2022 | Shekhar | G06F 18/211 |
| 2023/0078218 A1* | 3/2023 | Wang | G06N 3/098 |
| | | | 706/12 |
| 2023/0169746 A1* | 6/2023 | Dwivedi | G06F 18/214 |
| | | | 382/128 |
| 2023/0316536 A1* | 10/2023 | Lee | G06V 10/82 |
| | | | 382/103 |

* cited by examiner

EXAMPLE-BASED IMAGE ANNOTATION

BACKGROUND

Machine learning is a field of artificial intelligence that allows computer-implemented systems to perform a task without the use of task-specific code. Machine learning systems may be trained to progressively improve performance of a task using sets of training data. In computer vision, machine learning models are used to detect objects, such as people, cars, animals, and other objects of interest from input image data. In supervised machine learning, annotated data (e.g., data with input and labeled desired output) can be used to "train" a machine learning model. During training, parameters (e.g., weights and/or biases) of the machine learning model are adjusted so that the output of the machine learning model for a given input matches the desired output from the annotated data. Thereafter, during inference, the trained machine learning model can make predictions when provided with unannotated input data. Accuracy and/or predictive value of machine learning models are often a function of the quantity and quality of annotated data used to train the machine learning model.

DETAILED DESCRIPTION

Figure 1:
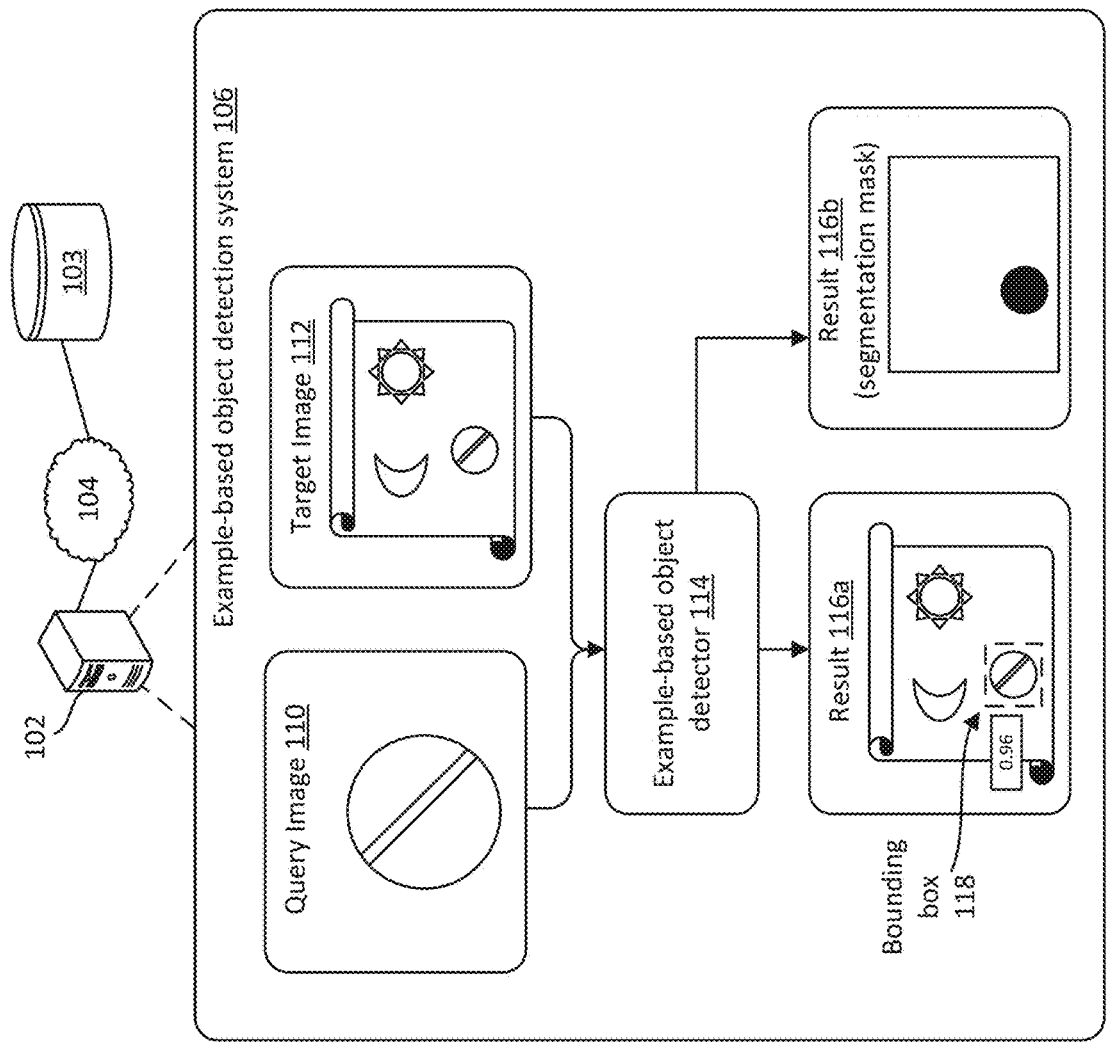
FIG. 1 is a diagram depicting an example-based object detection system, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In various examples, deep learning techniques may be used to detect objects in image data (e.g., pixel representations of objects). Convolutional neural networks (CNNs), single shot detectors (SSDs), region-convolutional neural networks (R-CNNs), Faster R-CNN, Region-based Fully Convolutional Networks (R-FCNs) and other machine learning models may be trained to perform object detection and classification. Object detectors may be trained to detect particular classes of objects (e.g., object classes), such as humans, dogs, furniture, cars, etc. Training any of these object detection models and/or other machine learning models, may typically employ annotated training data. Annotated training data comprises labeled image data including data representing bounding boxes that identify the location of objects represented in the image data along with classification data identifying a class of the object (e.g., data representing "cat", "dog", "human", etc.). Object detection by machine learning models may be heavily dependent on annotated training data. Generally, although feature vectors may be referred to herein, the various techniques described below may instead use (or additionally use) feature maps. Accordingly, as used herein, feature data may refer to either feature vectors, feature maps, or some combination thereof.

Training data for training computer vision object detection models may be expensive and time-consuming to generate. In various examples, images may be manually annotated by humans. For example, human annotators are typically provided annotation interfaces where the annotator draws a bounding box around specific objects of interest and provides a label for those objects. These annotated images may be used to train an object detection model to detect the objects that were labeled in the training data. However, such a process is slow, cumbersome, and expensive. Additionally, this process typically enables the object detection model to detect only those classes of objects that were annotated in the training data.

Machine learning techniques, such as those described herein, are often used to form predictions, solve problems, recognize objects in image data for classification, etc. For example, machine learning techniques may be used to detect objects represented in image data and/or translate text from one spoken language to another. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models (e.g., transformer machine learning models) are machine learning models that include an encoder network and a decoder network. The encoder takes an input and generates feature representations (e.g., feature vectors, feature maps, etc.) of the input. The feature representation is then fed into a decoder that may generate an output based on the encodings. In natural language processing, transformer models take sequences of words as input. For example, a transformer may receive a sentence and/or a paragraph comprising a sequence of words as an input. In various examples described herein, a transformer may instead receive a set of images of objects as input and/or feature representations of such images. In various examples, the transformer may receive a feature representation of a query image and a feature representation of a target image. The query image may be a depiction of an object-of-interest (e.g., a logo, pictogram, class of object, etc.). The target image may be a scene that may or may not include a visual representation of the object-of-interest (or some portion of the object-of-interest). The computer vision task to be carried out may be for the transformer to determine whether an instance of the object-of-interest (or a portion thereof) is visually represented in the target image and, if present, location(s) of the same. For example, the query image may be an image of a logo and the target image may be an image of the product (which may or may not include an image of the logo). The example-based object detection system described herein may be effective to determine whether the logo depicted in the query image is present in the target image. The example-based object detection system described herein may be effective to detect the presence of the query image despite various distortions and/or transformations that may cause differences between the depiction of the object-of-interest in the query image and the object-of-interest in the target image. For example, the depiction of the object-of-interest in the target image may be rotated, incomplete, distorted, sheared, etc., relative to the depiction of the object-of-interest in the query image.

In some examples, one or more backbone networks (e.g., convolutional neural networks (CNNs)) may be used to generate feature embeddings representing the depictions of the objects in the query image and the target image. These embeddings may be input into a transformer encoder (e.g., along with positional embeddings describing a spatial position of various objects in the target image and/or query image). As described in further detail below, a robust feature mapping module may determine whether the object-of-interest of the query image is represented, in whole or in part, in the target image. Additionally, an object detection head of the example-based object detection system may output a bounding box surrounding the depiction of the object-of-interest present in the target image. In some examples, a segmentation head may be used to output a segmentation mask that identifies those pixels corresponding to the object-of-interest in the target image. As described in further detail below, the output of the example-based object detection system may be used in an object detection context, and/or may be used to automatically annotate images for training a high-precision object detection model (e.g., for a particular set of object classes).

In general, the encoder network of a transformer comprises a set of encoding layers that processes the input data one layer after another. Each encoder layer generates encodings (sometimes referred to as "tokens"). These tokens include feature representations (e.g., feature vectors and/or maps) that include information about which parts of the input data are relevant to each other. For example, for each input embedding, the encoder layers may determine which parts of the token are relevant to other tokens received as part of the input data. For example, the encoder layers may determine which portions of the target image are most relevant to the depiction of the object-of-interest in the query image.

Each encoder layer passes its token output to the next encoder layer. The decoder network of the transformer takes the tokens output by the encoder network and processes them using the encoded contextual information and the encoder-decoder attention mechanism to generate output embeddings. Each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data or in various examples described herein, the positions of the items in the input scene image. In various examples described herein, the position embedding may describe a spatial relationship of a plurality of tokens relative to other tokens. For example, an input token may represent a 16×16 (or other dimension grid) overlaid on an input frame of image data. The position embedding may describe a location of an item/token within the grid (e.g., relative to other tokens representing other portions of the frame). Accordingly, rather than a one-dimensional position embedding (as in the natural language context wherein the position of a word in a one-dimensional sentence/paragraph/document is defined), the various techniques described herein describe two-dimensional that describe the spatial location of a token within the input data (e.g., a two-dimensional position within a frame, a three-dimensional position within a point cloud, etc.).

Each decoder layer comprises three components: a self-attention mechanism (e.g., scaled dot product attention), an attention mechanism over the encodings (e.g., "encoder-decoder" attention), and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

In an example use case, logo and/or pictogram detection in image data can be used in a product compliance setting to determine whether an item complies with applicable rules and/or regulations. Some object detection approaches in this domain leverage transfer learning and learn from a large number of labeled training samples, with the average number of training examples being ~1000 per object class, depending on complexity of the classes being detected. The number of training samples required increases for domains for which there exist no such parallel corpora from which to transfer knowledge. Currently, the process of annotation labeled image data for object detection is manual, with human labelers manually marking the regions in the image containing the object-of-interest. There are ongoing efforts to automatically generate labels for different problem types (e.g., Generative Adversarial Networks (GANs) are used for image generation/classification, self-supervised learning models to segment from video data, etc.). However, no such methods exist for object detection problems which are domain specific. For example, in the compliance world, there is an increasing goal to detect different logos, pictograms, and symbols to ensure the product complies with the regulations set forth by a specific marketplace.

Described herein is an example-based smart annotator system effective to automatically generate labels and annotations for object detection problems, even when the system has not been exposed to the particular class of object previously. As described herein, the proposed system receives a target image and a query image as input, and outputs bounding-box coordinates and/or segmentation masks, highlighting the area of the image that includes the object-of-interest (or a portion thereof). These machine-generated annotations, can be used as-is to derive actionable insights, and/or may be combined with small amount of manually-annotated data (depending on performance needs) and used to train a supervised system with higher precision requirements. This system reduces the time and effort required to manually annotate images to perform object detection/segmentation by automatically generating the annotations. The automatically-generated annotations may then be leveraged to build a domain-specific object detection system.

FIG. 1 is a diagram depicting an example-based object detection system 100, in accordance with various aspects of the present disclosure. In various examples, one or more computing devices 102 may be used to implement the example-based object detection system 106. The one or more computing devices 102 may be configured in communication with one another over a network 104. Network 104 may be a communication network such as a local area network (LAN), a wide area network (such as the Internet), or some combination thereof. The one or more computing devices 102 may, communicate with non-transitory computer-readable memory 103 (e.g., either locally or over network 104). Non-transitory computer-readable memory 103 may store instructions that may be effective to perform one or more of the various techniques described herein. For example, the instructions may be effective to implement one or more of the various machine learning models described herein.

In the example of FIG. 1, example-based object detection system 106 may receive query images (such as query image 110) and target images (such as target image 112). A query image 110 may be an image of an object-of-interest. For example, the object-of-interest may be a logo, pictogram, and/or other object-of-interest. The goal of the example-based object detection system 106 is to locate representations of the object-of-interest in the target image 112. In the example depicted in FIG. 1, the object-of-interest 110 in the query image may be a logo with a circle bisected with a diagonal stripe. Although not shown in the black and white image of FIG. 1, the logo in query image 110 may include one or more colors. The target image 112 depicts a scene including various objects including a moon, a sun-shaped logo, and a circle with a diagonal stripe.

The query image 110 and the target image 112 may be input into the example-based object detector 114. As described in further detail below, example-based object detector 114 may include one or more CNN backbone networks trained to extract feature data from the query image 110 and the target image 112. The feature data representing the object-of-interest 110 and/or the scene of the target image 112 may be input into a robust feature mapping module. The robust feature mapping module may be configured to encode the similarity between the feature embeddings representing the object-of-interest in query image 110 and different portions of the target image 112. The encoded output of the robust feature mapping module may be input into a transformer encoder. A transformer decoder may determine and/or locate a depiction of the object-of-interest (in whole or in part) in the target image 112 (if it exists therein). Although, in various examples described herein, the architecture of the example-based object detector 114 may include a robust feature mapping module and/or a transformer model, in some other examples, other machine learning algorithms may be used to locate representations of an object represented in a query image within a target image.

The example-based object detector 114 may be implemented with an object detection head and/or a segmentation head, as desired. An object detection head may be implemented, for example, as a feed forward network (FFN) and may generate a bounding box surrounding the depiction of the object-of-interest in the target image 112. Accordingly, in result 116a, bounding box 118 surrounds the depiction of the object-of-interest (the circle with the diagonal stripe) from query image 110. In some examples, a confidence score may be generated indicating a confidence of the example-based object detector 114 that the bounding box 118 identifies a depiction of the object-of-interest from the query image 110. In various examples, the example-based object detector 114 may have a segmentation head effective to generate a segmentation mask (e.g., result 116b). The segmentation mask may be a binary mask with all pixels predicted by example-based object detector 114 as being part of the depiction of the object-of-interest having a first value (e.g., a 1 or a 0) and all pixels that are not part of the depiction of the object-of-interest having a different value. Accordingly, in the example of FIG. 1, the depiction of the object-of-interest appears black in result 116b while the remainder of the frame of image data (e.g., from target image 112) appears white. Although, in other examples, a segmentation mask may feature the object-of-interest in white while other pixels not pertaining to the object-of-interest may be black.

It should be appreciated that the example-based object detector 114 may be effective to detect objects-of-interest even when the example-based object detector 114 was not exposed to any depictions of that object-of-interest (e.g., any objects of the same class as the object-of-interest) during training of the example-based object detector 114. Instead, during training, the example-based object detector 114 learns to generate feature representations of the input query images and target images. Further, the example-based object detector 114 determines similarity between portions of the query image 110 and portions of the target image 112. Such similarity detection is robust to transformations of the depiction of the object-of-interest in the target image. For example, the depiction of the object-of-interest may be deformed (e.g., a logo printed on a deformed three-dimensional surface), rotated, sheared, etc., in the target image 112 relative to the depiction of the object-of-interest shown in the query image 110.

Described herein are various techniques for One-Shot Object Detection, a challenging task of detecting novel objects in a target scene using a single reference image—referred to herein as a query. Existing research on one-shot detection has primarily focused on modifying two stage object detectors to learn a metric for classifying proposed regions. These methods however, rely heavily on the quality of initial region proposals, which cannot be guaranteed under one-shot settings. To address this challenge, described herein are novel transformer-based end-to-end architectures that perform reasoning at the scene level in a unified manner to detect objects of novel classes. In some examples, the model architecture and/or techniques described herein may be referred to as Surfacing Positions using Transformers ("SPOT") for brevity. SPOT uses synergy between the provided query and target images using a learnable Robust Feature Mapping (RFM) module (e.g., a feature mapping component), which emphasizes the features of targets based on visual cues from the query. In various cases, a large dataset of query-target pairs may be curated from logo and pictogram domains, which are better candidates for the one-shot detection problem. The model described herein performs significantly better than the current state-of-the-art, demonstrating SPOT's generalization capabilities over novel object categories.

The availability of large amount of labeled data for training has been a key enabler for the success of deep learning in Object Detection tasks. While open source data facilitate research and development in academic settings, real-world use cases need domain-specific datasets which are not only costly but challenging to obtain. In such a limited data setting, deep networks would, in most cases, overfit the training distribution and fail to adequately generalize to unseen examples. In many domains, like product compliance where there is dynamicity in the nature of legal requirements, a massive backlog of products is created for reassessment whenever the compliance definitions change. These definitions can range from having certain declarations displayed on the product packaging to mandating the presence of certain regulatory logos and pictograms. The absence of compliance checks can lead to potential safety hazards and poor customer experience, along with legal expenses. Sellers and platforms are then essentially stuck in a situation where they need to wait longer to onboard their offerings because of new or updated compliance requirements and platforms need to onboard a massive human workforce to go through millions of product images to ensure compliance. This end-to-end process is managed manually until human annotators gather enough data and a machine learning model is trained to help with this work-load. Therefore, object detection systems that can work with very few examples become critical for success in these areas.

SPOT takes inspiration from the way the human visual system functions to perform a novel object detection task in an example using a representative example. To localize the object, human visual systems compare the representative example against different sections of the image, extract characteristic features, and build correlations. Human visual systems accomplish this while placing special attention on the features that differentiate the object from the 'context' in the target image. This task can be performed with great efficiency under wide variations in object appearances, lighting conditions, viewing angles, etc. For the problem formulation described above, it may be assumed that an example of the unseen class (query) would be provided, and the task will be to uncover all the regions in the target image which are visually similar to the query. SPOT (Surfacing POsitions using Transformers) is a novel end-to-end trainable model based on transformers which emphasizes the features of the target image based on visual cues from the query using Robust Feature Matching for detecting objects of novel classes.

1.1 Object Detection

Object detection as a task, has a dual objective of locating and classifying objects in a scene. The modern Neural Network based Object detection systems can broadly be classified into two categories—one stage and two stage detectors, each of them using a form of deep CNN as a backbone to generate image representations (e.g., image features). The two stage detectors, dominantly Faster R-CNN and its variants first generate coarse region proposals using a region proposal network (RPN), then classify and fine-tune the proposed regions. Single stage detectors like YOLO, SSD and others skip the region-proposal step and directly predict on a fixed set of densely placed anchors, thus improving the inference speed at the cost of some loss in detection performance. Each of the above mentioned methods rely on many hand-designed components like a non-maximum suppression procedure or anchor generation that explicitly encodes prior knowledge about the task. The recent work DEtection TRansformer (DETR) attempts to streamline this detection pipeline, effectively removing the need for these hand-designed components. At its core, DETR uses a set-based global loss that forces unique predictions via bi-partite matching, and a transformer encoder-decoder architecture, which achieved competitive performance on many benchmarks.

1.2 Few Shot Learning

Deep Learning models, which are the norm in computer vision, are data hungry and require large amount of manually annotated training data to learn. Even then, the trained models are only able to predict for seen class distribution. Few Shot Learning aims to overcome this constraint and generalize over unseen classes (query set) using very few labeled examples (support set). For an N-way, K-shot setup, the support set includes K labeled examples for each of the N classes. In an example where the support set consists of 0 or 1, the setup is referred to as a zero-shot and one-shot learning setup respectively. There are three main approaches to tackle the problem of a Few Shot Learning setup 1) Transfer learning—where new distributions are learned via fine tuning 2) Meta Learning—where model learns to extract meta-level knowledge to parameterize the optimization and generalize on new tasks with limited data, so-called "learning-to-learn" and 3) Metric learning—where the goal is to derive a similarity metric that can be directly applied to the inference of unseen classes. One-shot settings (relevant to the problem formulation described above, first proposed for one shot image classification using Siamese networks) overwhelmingly adopt metric learning due limited support (one image) for fine tuning via transfer learning or meta learning.

1.3 One Shot Object Detection

Although hard to solve, one shot settings have a unique advantage that, once trained, the models can be used to detect objects of unseen classes without fine-tuning. Previous works have attempted to solve the problem using metric learning and a two-stage architecture similar to Faster-RCNN and replacing the standard classification head with a metric based classification head. Early models used an RPN which did not depend on the target class and therefore relied heavily on the quality of class-agnostic region proposals, which cannot be guaranteed in a one-shot setting. Later works improved the state-of-the-art by using attention mechanisms to influence the region proposals and generate class-specific proposals. However, the quality of initial region proposals cannot be guaranteed in the one-shot/few-shot setups thus producing inaccurate or missed detection.

Described herein are techniques that build synergy between the provided query and target images using a learnable Robust Feature Mapping (RFM) module that emphasizes the features of targets based on visual cues from the query and moving away from reliance on priors. Initially introduced for natural language processing, transformers are increasingly gaining popularity in the computer vision space. The recent developments on few-shot detection using transformers showed promising results on benchmark datasets.

2 Method

In this section, the neural network architecture, RFM module and training methods of SPOT are described. A one-shot object detection network is created by extending DETR, an end-to-end detection model composed of a backbone (typically a convolutional residual network), followed by a Transformer Encoder-Decoder. DETR streamlines the detection pipeline, effectively removing the need for many hand-designed components like a non-maximum suppression procedure or anchor generation that explicitly encode the prior knowledge about the task. This is particularly important for the problem formulation described below, since one-shot detection models need to be able to generalize on unseen classes. This requires the learning procedure to move away from encoding priors and focus on matching the features between the query and the relevant sections of the target image.

2.1 Problem Formulation

Consider the task of object detection over a set of class labels, denoted as $C_{all}$ with data $D_{all}$. The label set may be further divided as $C_{all} = C_{train} \cup C_{test}$, where $C_{train}$ includes those classes, which are available during training and C test includes those labels that were unseen during training. $C_{train}$ can be reduced further to extract the validation label set $c_{val}$, such that $C_{train} \cap C_{val} = \emptyset$. Correspondingly, there is $D_{train}$, $D_{val}$. In practice, for constructing $D_{val}$ and $D_{test}$, a subset of training classes along with $C_{val}$ and $C_{test}$ may be used to evaluate the model's performance on both seen and unseen classes.

The problem of one-shot object detection is formulated as follows. Given a query image patch q, depicting an instance of a particular object class from $C_{all}$, the inference task is to uncover all the corresponding instance(s) of the same class in a target image t. In the techniques described herein, it may be assumed that each target image includes at least one object instance of the class corresponding to the query. Note that this formulation potentially helps to scale to classes which are beyond the ones used for evaluation and not just restricted to $C_{all}$, as long as the distributions remain close.

2.2 Novel Object Localization

Consider the problem of classifying two images q and t as similar or dissimilar. Essentially, the objective is to learn a function sim(q, t) that scores the similarity between images q and t. One way of constructing sim is by using a convolutional network f. In a siamese network, both the images are passed through the same convolutional network to obtain feature vectors f(q) and f(t) respectively. The distance between these two vectors can serve as a measure of similarity.

$$\text{sim}(q,t)=g(f(q),f(t)) \quad (1)$$

The distance function g in 1 can be a simple function like the Euclidean norm or a more complex learnable function such as a neural network.

Moving on to the problem of localizing a novel object in an image, here, the query image q contains the object of interest, and we would like to find the location of this object in a larger image t. A simple way of addressing this problem is to have a sliding window over the larger image t and compare each patch of t with q. The location of q inside the large image t is found when we get a matching patch. If the convolutional network f is fully convolutional, then the larger image t can be passed through the same convolutional network f to obtain a feature map f(t), where each "pixel" in the resulting feature map will be identical to the feature vector that would have been obtained from the corresponding window in the input image. Subsequently, the feature vector f(q) is compared with each pixel of the feature map f(t) to determine where the object of interest lies in t. If i and j are the accessors of f(t), the similarity score for each window is, $$\text{sim}_{i,j}(q,t)=g(f(q),f_{i,j}(t)) \quad (2)$$

Figure 7A:
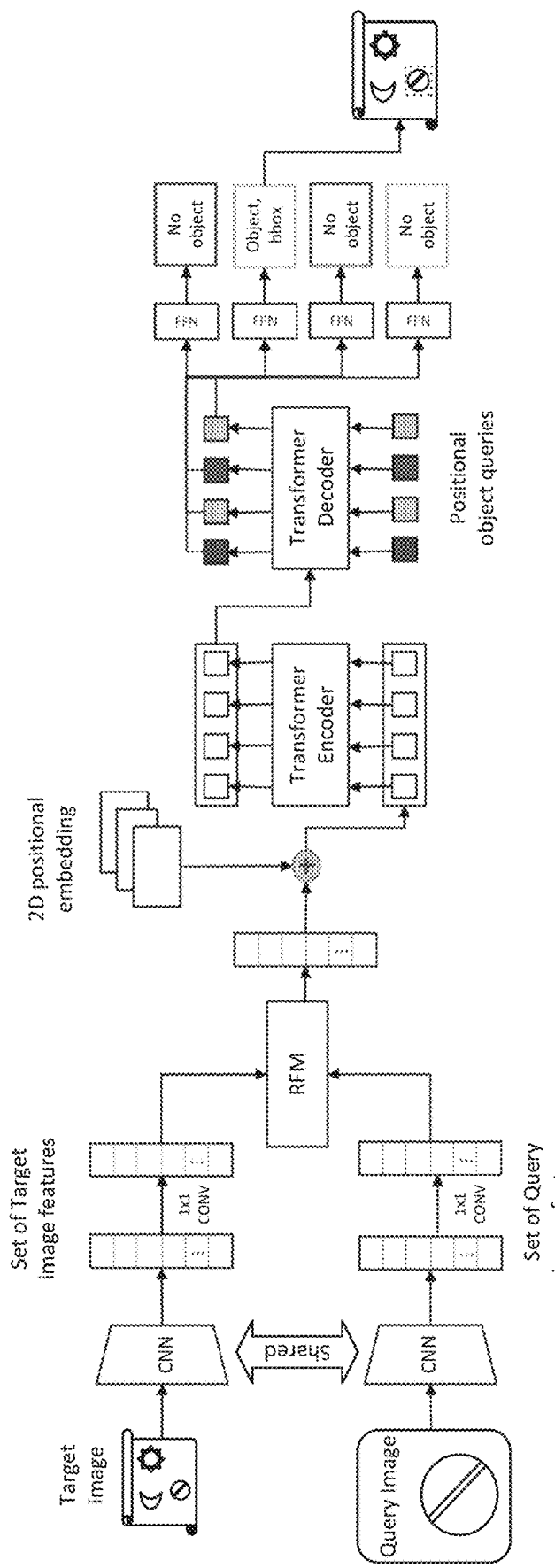
FIG. 7A is a diagram of an example architecture of the example-based object detection systems described herein, in accordance with various aspects of the present disclosure.

This solution would have worked if we had a way of aligning the query and target scales. Given that in practice, the scale of query and targets can be arbitrary, we can hypothetically construct image pyramids of varying scales and repeat the steps over each pyramid. However, such a system would have very high latency and increased computational cost. FIG. 7A depicts the SPOT architecture and describes how SPOT extends the above ideas and addresses the above-described problems by evolving into an end-to-end learnable system which can learn to spot the provided query at relevant position(s) on the target.

Figure 2A:
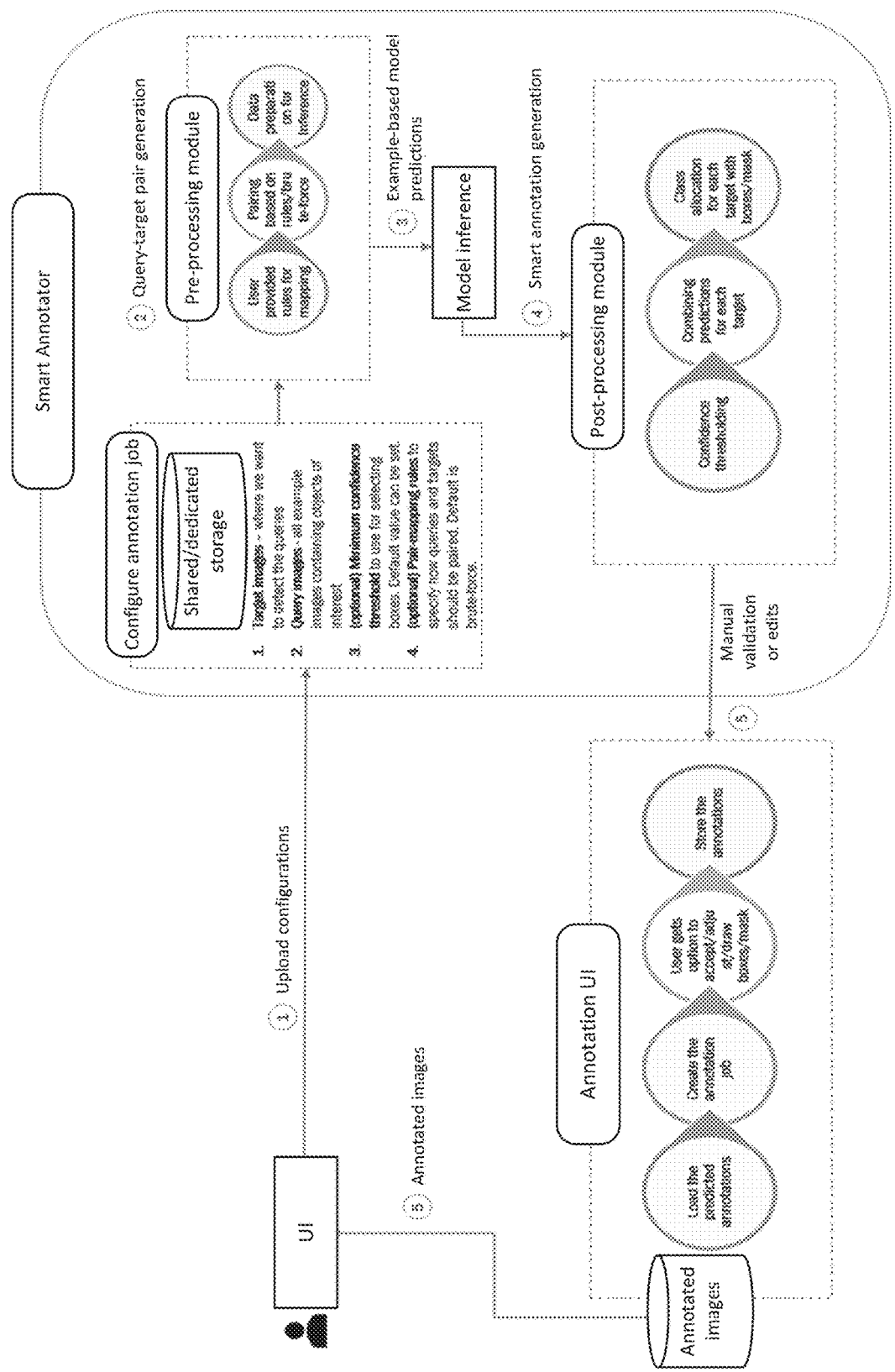
FIG. 2A is a block diagram illustrating an example-based annotation system, in accordance with various aspects of the present disclosure.

FIG. 2A is a block diagram illustrating an example-based annotation system, in accordance with various aspects of the present disclosure. As shown, a user may upload configurations (action 1) using a user interface (UI). The configurations may include target images (e.g., those images in which objects represented in query images are to be detected) and query images (e.g., examples images including classes of objects to be detected in the target images). Note that the example-based object detector 114 need not be trained using training data that includes object classes of the query images. Indeed, the example-based object detector 114 may detect objects from the query images in the target images even when the example-based object detector 114 has never been exposed to objects of the relevant class before. The user-uploaded query images may include class labels labeling the classes of the respective objects-of-interest depicted in the user-uploaded query images.

The configurations uploaded at action 1 may further include an optional minimum confidence threshold. If the confidence score of an object detection in a target image is below the minimum confidence threshold the bounding box in the target image may be discarded. If no minimum confidence threshold is supplied, a default value may be used in some examples.

In some examples, an optional pair-mapping rules may be provided during the configuration upload (e.g., at action 1). Pair-mapping rules may map certain query images to certain target images. For example, a first query image of a vegetarian logo may be mapped to target images representing food products. A second query image of a medical logo may be mapped to target images representing medical products, and so on. If no pair-mapping rules are supplied, a brute force approach may be employed wherein the example-based object detector 114 may attempt to find objects represented in each query image in each target image.

At action 2, query-target pairs may be generated for input into the example-based object detector 114. Action 2 may include pre-processing to define query-target pairs according to user-provided rules for mapping (e.g., pair-mapping rules provided during the configuration upload). Action 2 may further include pairing based on default rules. For example, in a brute force approach, each query image may be paired with each target image. In some examples, other pre-processing may be performed in order to prepare the data (e.g., query image/target image pairs) for inference.

At action 3, the query image/target image pairs (as pre-processed) may be input into the example-based object detector 114 for inference. At action 4, each target image may be annotated with bounding boxes/segmentation masks showing a detection of an object of the class shown in the relevant query images. Additionally, a class label and/or a confidence score may be generated for the located objects. As previously described, if a threshold confidence label is being used, any detected objects with confidence scores below the minimum confidence threshold may be discarded/disregarded during a confidence thresholding post-processing step. In some examples, the predictions for each target image may be combined. For example, multiple query objects of different classes may be detected in a target image. Each of the object detections may be combined into a single annotated target images displaying detected multiple objects from different query images. Additionally, the multiple query objects detected may be labeled with their respective class labels (e.g., "vegetarian logo," "warning logo," etc.) and confidence scores.

Figure 2B:
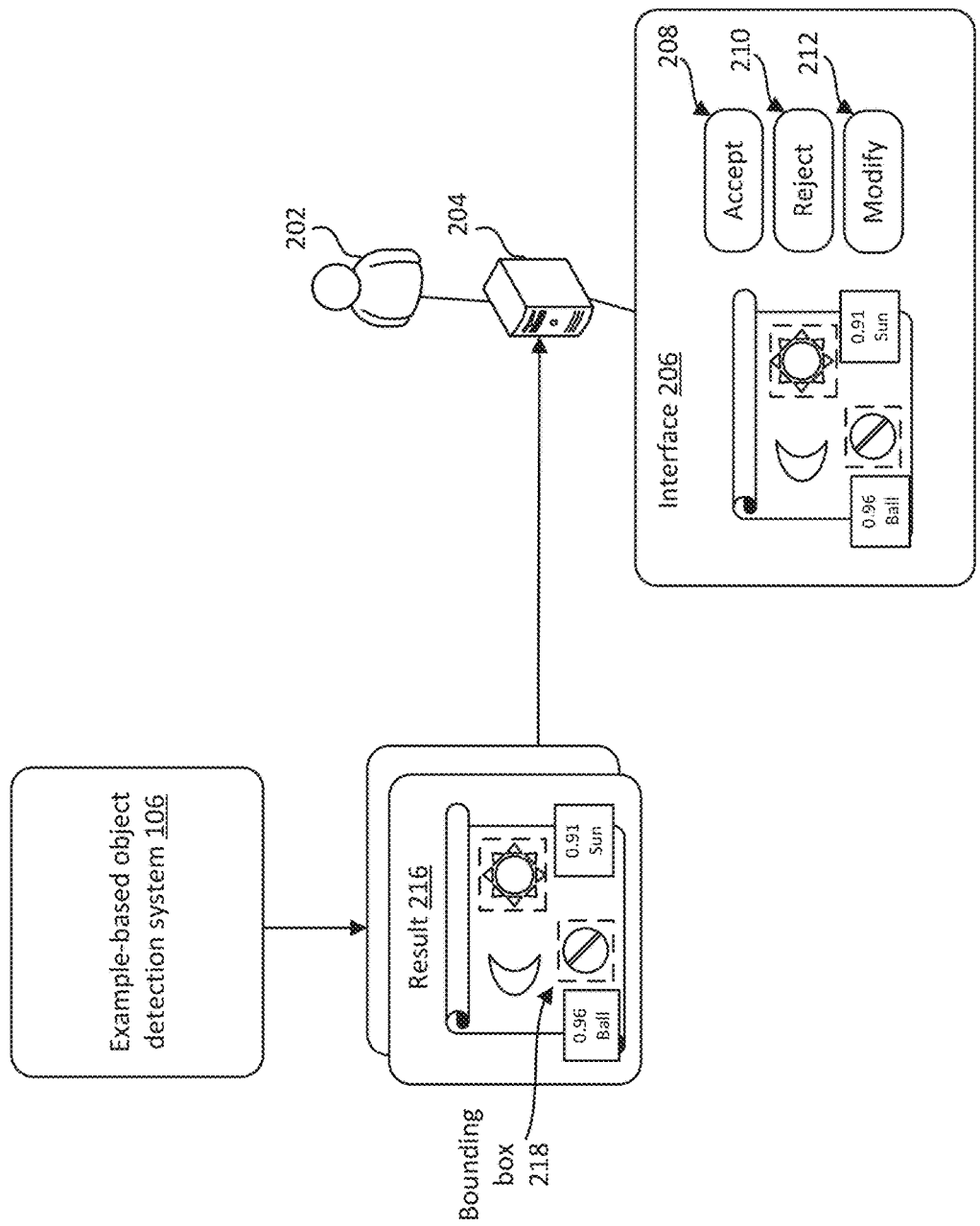
FIG. 2B is a block diagram illustrating an annotation interface for use with the example-based object detection system of FIG. 1, in accordance with various aspects of the present disclosure.

After post-processing, the annotated target images may be provided to an annotation UI at action 5. An example annotation UI is shown in FIG. 2B. The annotated target images may be loaded, and a user (e.g., a human annotator) may be provided with options to accept the annotation of the relevant object as accurate, adjust the annotation (e.g., the class label and/or the bounding box, adjust the segmentation mask, etc.), etc. The resulting user-annotated images may be stored in memory and may be used to train a domain-specific, high-accuracy object detection model.

FIG. 2B is a block diagram illustrating an annotation interface 206 (e.g., an annotation UI) for use with the example-based object detection system of FIG. 1, in accordance with various aspects of the present disclosure. As previously described, the example-based object detection system 106 may be used in various object detection applications (e.g., image analysis such as used by self-driving cars, compliance evaluation, etc.) to detect previously-unseen objects based on the example images provided as the query image. However, in other examples, the example-based object detection system 106 may be used as part of an annotation system, as depicted in FIG. 2B.

For example, the goal may be to train a high-precision, domain-specific object detection model using supervised learning. The goal of the domain-specific object detection model may be, for example, to detect a particular logo for a compliance application. Accordingly, a high-quality image of the logo may be supplied to the example-based object detection system 106 as a query image. Thereafter, a corpus of target images may be input into the example-based object detection system 106. The example-based object detection system 106 may generate results 216. The results 216 may localize the object-of-interest in images in which depictions of the object-of-interest appear (in whole or in part). As previously described, the results 216 may include bounding box 218 localizations and/or segmentation masks.

The results 216 may be provided to an annotation interface 206 provided by a computing device 204. The annotation interface 206 may be used by annotator 202 to generate training samples for the domain-specific object detection model. Generally, instead of the annotator 202 drawing a bounding box around the depiction of the object-of-interest in each image and/or manually creating a segmentation mask, the interface 206 may present the results 216 showing the automatically-generated images in which the depictions of the object-of-interest are localized (using bounding boxes 218 and/or segmentation masks, depending on the implementation). The annotator 202 may be provided with the option to accept the annotated image (e.g., result 216) as an accurate annotation (e.g., via a graphical control 208). Additionally, the annotator 202 may be provided with an option to reject the annotated image (e.g., indicating that the localization and/or label of the annotated image are inaccurate) (e.g., via a graphical control 210). In another example, the annotator 202 may be provided with a control (e.g., graphical control 212) that the annotator 202 may be used to modify the annotation. For example, the depiction of the object-of-interest may be correctly labeled, but the bounding box 218 may only cover a portion of the depiction of the object-of-interest. Accordingly, the annotator 202 may re-draw a portion of the bounding box to surround the entire object-of-interest.

Generating training samples using the example-based object detection system 106 may be far less time-consuming and expensive relative to manually-generating a sufficient number of training samples for training a high precision domain-specific object detector since the annotator 202 may simply accept accurate training samples and reject inaccurate training samples. In various examples where the object detector being trained is a multi-class object detector, the query images may also include label (e.g., class labels). Accordingly, the results 216 may not only localize the depiction of the object-of-interest, but may also label the depiction of the object-of-interest according to the query image. Although not shown, a "re-label" control may be provided via the annotation interface 206 so that the annotator 202 may re-label a detected object (in the event that the bounding box is correct, but the label is incorrect).

In the example of FIG. 2B, a first query image may have included a representation of a Ball logo (e.g., the circle with a diagonal slash) and a second query image may have included a representation of a Sun logo. The target image may have included a scene (e.g., a product image and/or any other image) that displays the Ball logo, the Sun logo, and a moon logo. In this example, the moon logo was not a query image. Accordingly, the example-based object detection system 106 does not detect the moon logo. Instead, the moon logo is considered part of the background. However, since example query images have been provided for the Ball logo and the Sun logo the example-based object detection system 106 detects the representations of the Ball logo and the Sun logo within the target image and has drawn bounding boxes around these representations in the target image. Additionally, the example-based object detection system 106 has displayed confidence scores representing a confidence in the prediction along with class labels displaying the relevant object class (e.g., as supplied with the query images).

Figure 3:
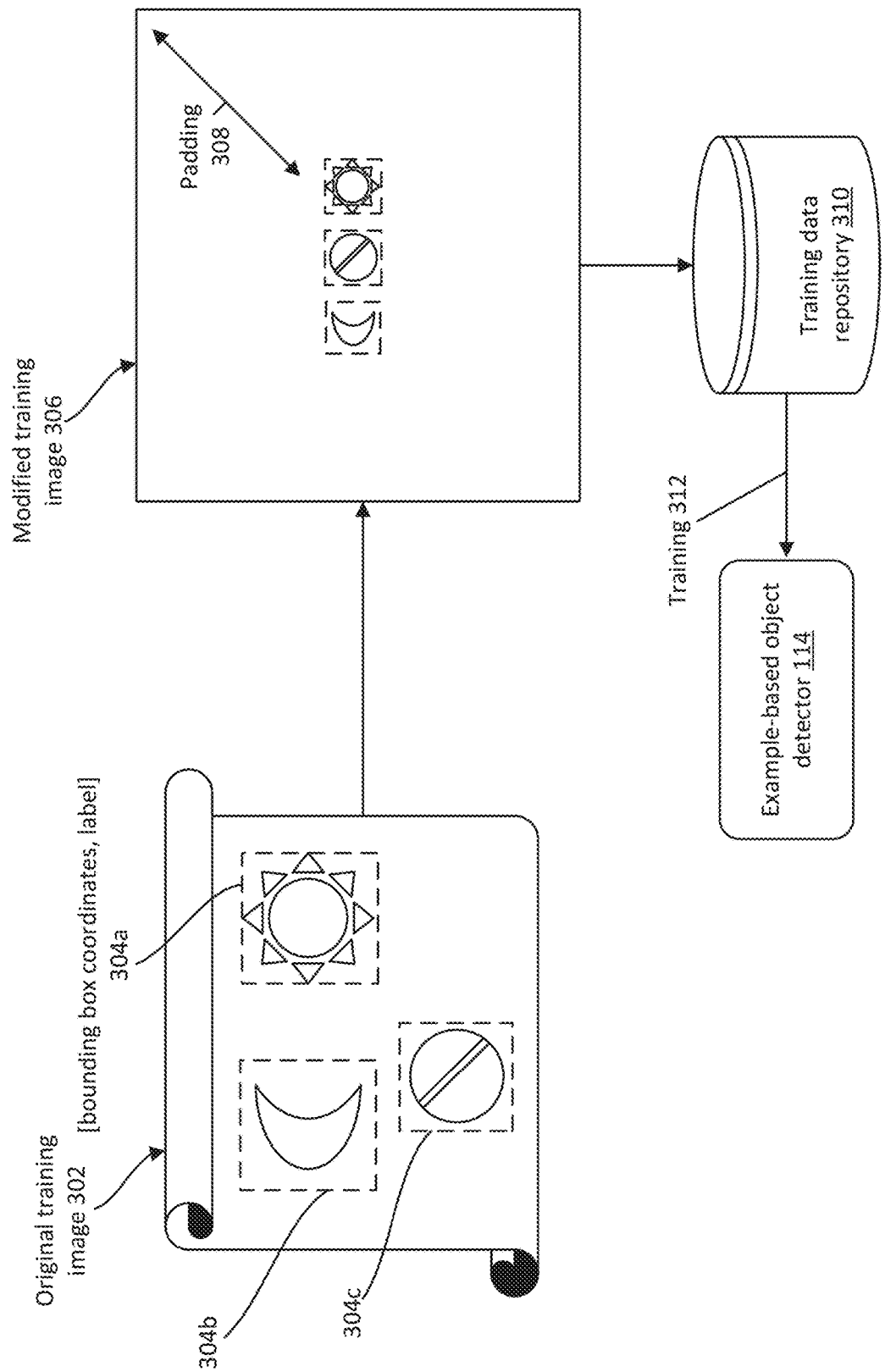
FIG. 3 depicts an example of modifying a dataset for training an example-based object detection system, in accordance with various aspects of the present disclosure.

FIG. 3 depicts an example modification of a dataset for training an example-based object detection system, in accordance with various aspects of the present disclosure. In various examples, the depictions of objects in the target images (e.g., target image 112) may be sized differently relative to the example objects-of-interest depicted in the query images 110. Accordingly, the example-based object detector 114 may be trained using example target images with re-sized objects. For example, in logo detection the images of logos may be small when shown on a product image. Similarly, in detection of real-world objects (e.g., in a self-driving car navigation example) detected objects may be small in in a captured image when such objects are far away from the camera.

The example of FIG. 3 illustrates an example of modification of an original training image 302 to generate a modified training image 306. The original training image 306 may have multiple classes of objects. For example, a first class of object may have first bounding box coordinates and a corresponding object class label 304a. Similarly, a second class of object may have second bounding box coordinates and a second label, and a third class of object may have third bounding box coordinates and a third label. These images of object may be much larger relative to the typical objects to be detected in target image data. Accordingly, to make the example-based object detector 114 sensitive to such small-sized objects-of-interest, the images may be downscaled and padded (e.g., using 0-based padding 308) to generate modified training image 308. Modified training images 306 may be mixed with other training images (e.g., depicting various sizes of objects of interest) and stored in a training data repository 310. Once a sufficient amount of training data is stored the training corpus may be used to train the example-based object detector 114 (e.g., training 312). In at least some examples, the example-based object detector 114 may be trained end-to-end to update parameters of the feature-extraction backbone networks as well as the transformer model and/or object detection/image segmentation heads. After training 312, the example-based object detector 114 is effective to detect previously-unseen objects based on the examples provided in the query images. In various examples, modified training images may be created by cutting and pasting different query images (from one or more source images) into an image. For example, in FIG. 3, the sun, moon, and ball logos are originally in a first orientation in original training image 302. However, in modified training image 306 these logos are aligned.

Figure 4:
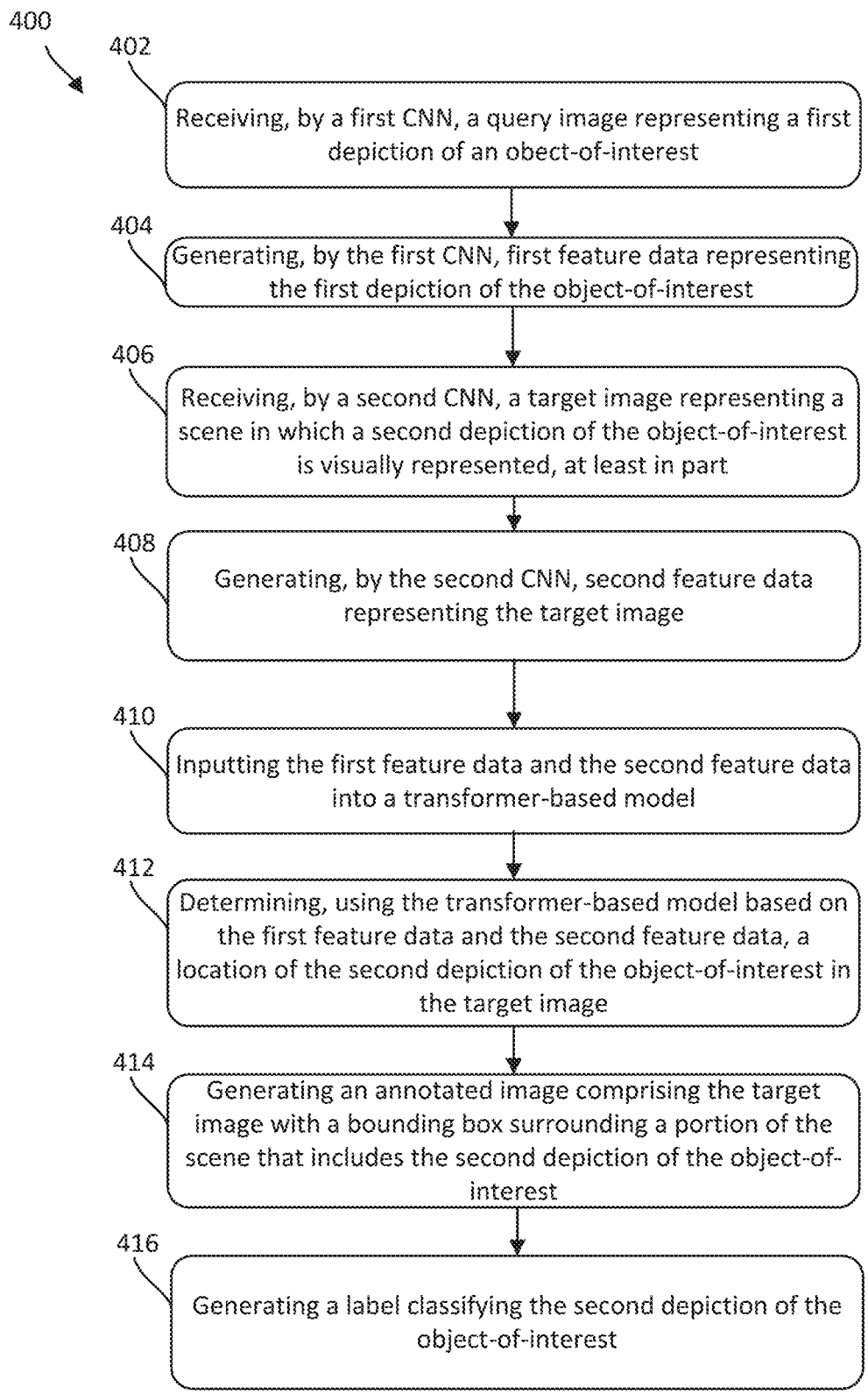
FIG. 4 depicts an example process for automatically generating annotated training data based on example images, in accordance with various aspects of the present disclosure.

FIG. 4 depicts an example process 400 for automatically generating annotated training data based on example images, in accordance with various aspects of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 402, at which a first CNN may receive a query image representing a first depiction of an object-of-interest. In various examples, the query image may include an example image of the object-of-interest that is to be detected in one or more target images.

Process 400 may continue to action 404, at which the first CNN may be used to generate first feature data that represents the first depiction of the object-of-interest in the query image. The first feature data may detect various edges, shapes, colors, and/or other visual information about the first depiction of the object-of-interest in the query image.

Process 400 may continue at action 406, at which a second CNN (or the first CNN, depending on the implementation) may receive a target image representing a scene in which a second depiction of the object-of-interest is visually represented, at least in part. For example, if the query image depicts a logo, the target image may depict a product that displays at least a portion of the logo. It should be noted that in some examples the target image may not include the logo. Accordingly, no object-of-interest may be detected in such images.

Process 400 may continue at action 408, at which the second CNN may generate second feature data representing the target image. For example, the second feature data may detect various edges, shapes, colors, and/or other visual information about the scene depicted in the target image, including the second depiction of the object-of-interest in the scene.

Process 400 may continue at action 410, at which the first feature data and the second feature data may be input into a transformer-based model. For example, the first feature data and the second feature data may be input into a transformer encoder. The transformer encoder may encode the various different regions of the input query image and target image and may use the attention mechanism and the similarity determined by the robust feature mapping module to locate the object-of-interest represented by the query image within the target image embedding.

Process 400 may continue at action 412, at which the transformer-based model may determine a location of the second depiction of the object-of-interest in the target image based on the first feature data and the second feature data. For example, a decoder of the transformer-based model may determine those portions of the target embedding that are visually similar to the representation of the object-of-interest in the query embedding. In various examples, the transformer decoder output may be sent to a object detection head and/or a segmentation head to generate the output image.

Process 400 may continue at action 414, at which an annotated image may be generated. The annotated image may include the target image with a bounding box that surrounds a portion of the scene that includes the second depiction of the object-of-interest. In other examples, a segmentation mask may instead be generated that segments the second depiction of the object-of-interest in the target image from the remainder of the target image.

Process 400 may continue at action 416, at which a label that classifies the second depiction of the object-of-interest may be generated. In various examples, the label may be provided with the query image and may be a label that classifies the example object-of-interest depicted in the query image.

Figure 5:
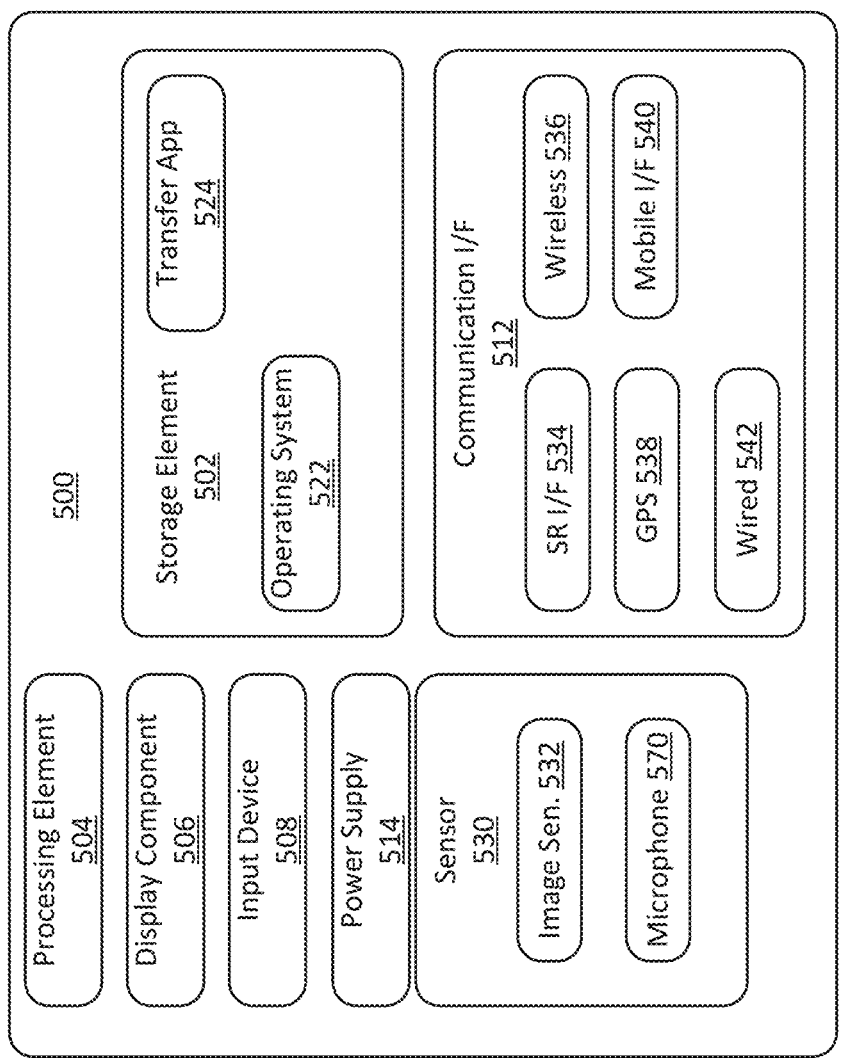
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models such as the backbone networks and/or the transformer models described herein, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In some further examples, the image sensor 532 may comprise a depth sensor and/or multiple depth sensors. For example, the image sensor 532 may include a TOF sensor, stereoscopic depth sensors, a lidar sensor, radar, etc.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
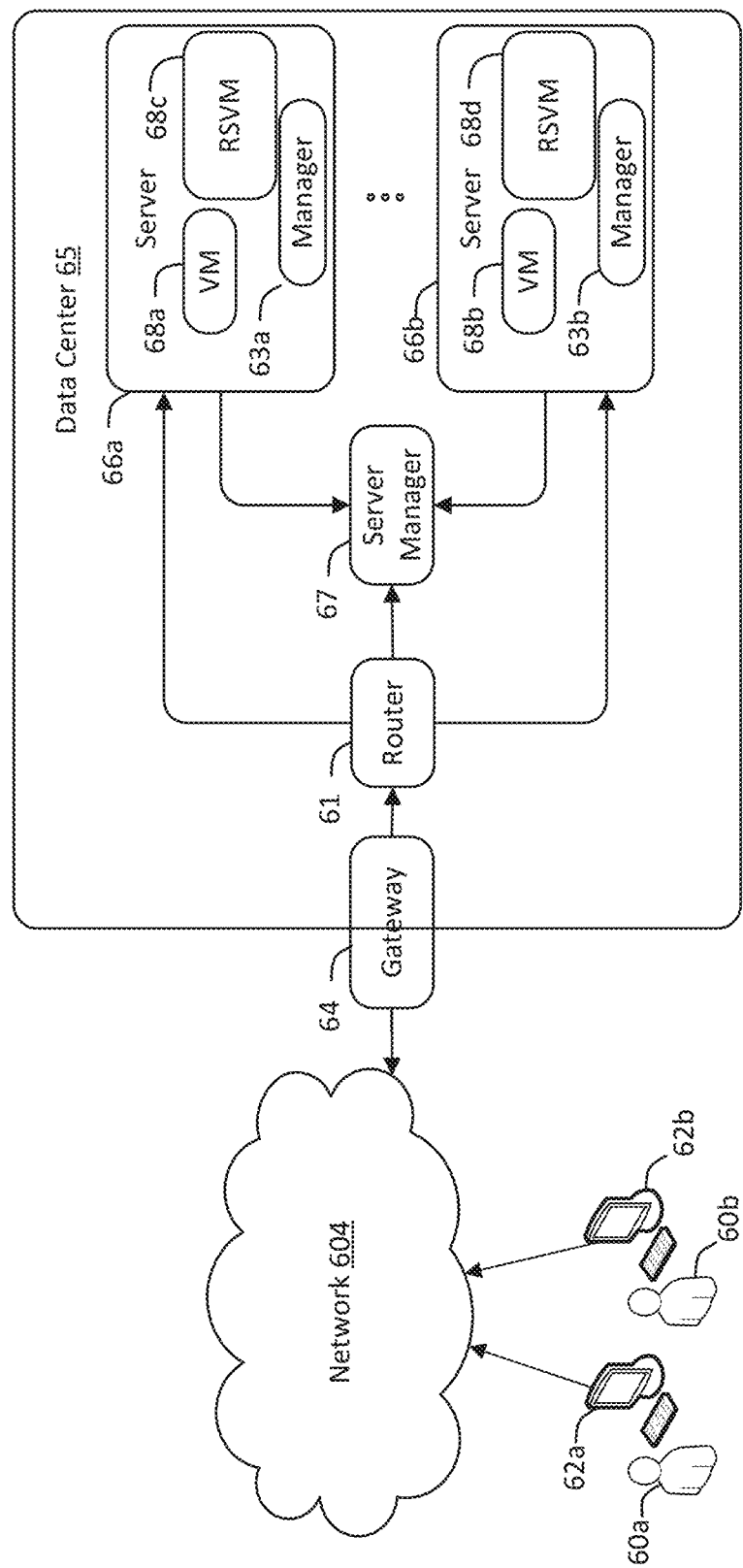
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

FIG. 7A is a diagram of an example architecture of the example-based object detection systems described herein, in accordance with various aspects of the present disclosure.

2.3 SPOT

An example architecture of the SPOT model (e.g., an implementation of the example-based object detector 114 of FIG. 1) is shown in FIG. 7A. In the implementation shown, the Fully Connected layers and the Global Pooling layer are removed from a pre-trained ResNet50 model (although another CNN may be used), and used the remaining convolutional layers as a feature extractor module. The target and query images are encoded by this same convolutional backbone to produce a sequence of hidden vectors (e.g., image features). That is, starting from an initial image of $x \in \mathbb{R}^{3 \times H_0 \times W_0}$ (with 3 color channels), the conventional CNN backbone generates a lower-resolution activation map $z \in \mathbb{R}^{C \times H \times W}$. In the example, C=2048 and $$H, W = \frac{H_t}{32}, \frac{W_t}{32}$$

are used. Hence, at the end of these feature extraction layers, $$z_t = 2048 \times \frac{H_t}{32} \times \frac{W_t}{32} \text{ and } z_q = 2048 \times \frac{H_q}{32} \times \frac{W_q}{32}.$$

These two sets of features may then be passed through a 1×1 convolution to reduce the channel dimension of the high-level activation map z from C to a smaller dimension d, creating a new feature map $f \in \mathbb{R}^{d \times H \times W}$.

Robust Feature Mapping

In the settings discussed herein, the target image is expected to contain much more information than the query. Since only a small region in t is supposed to match with q, directly comparing target and query features would not yield meaningful results. Hence, the Robust Feature Mapping (RFM) module may be included. This module accepts the target features f(t) and query features f(q), and learns to emphasize the values in f(t) which are closer to the features in f(q). The RFM module views a feature tensor of size 2048×H×W as a collection of H×W patch-wise feature vectors, each of dimension 2048. The RFM module has multiple learnable similarity function approximators, which function together as a bridge between f(t) and f(q) to emphasize those feature vectors in f(t) that bear close similarity with the feature vectors in f(q). If d is the dimension of f(q), the function from equation (2) above may be approximated in each similarity approximator as:

$$g(f(q), f_{i,j}(t)) = f_{i,j}(t)(w \times f(q)) \quad (3)$$

where w can be estimated as:

$$w = \text{softmax}\left(\frac{f(t)f(q)^T}{\sqrt{d}}\right) \quad (4)$$

In an example implementation, 8 such similarity approximators may be used (or any other suitable number), which may be combined in the same way as the Multi-Headed attention mechanism. The output of this layer is a weighted sum of the values in f(q) for each feature value in f(t), where the weight assigned to each value of f(q) is determined by its similarity to the feature channels of f(t). This layer produces an emphasized representation of the target image with the scores that capture the influence of query features f(q) for each feature value in the target f(t). RFM gives the model greater power to encode multiple relationships and nuances between f(q) and f(t).

Two-dimensional positional embeddings may be included with the emphasized target feature vector to conserve the spatial information. This sequence is fed into the transformer encoder. The transformer decoder takes as input a set of N learned embeddings (called "object-queries") that can be viewed as slots that the model needs to fill with detected objects. All the object queries are fed in parallel to the decoder, which uses cross-attention layers to look at the encoded image and predict the output embeddings for each of the object-queries. The final representation of each object query is independently decoded into box coordinates and class labels using a shared feed-forward layer. The number of object queries acts as an upper-bound on the number of objects the model can detect simultaneously. Since the actual number of objects in a particular image may be less than the number of queries N, we use an extra class label corresponding to "no object", denoted by ∅. The model is trained to output this class for every object-query that does not correspond to an object.

Losses Since box predictions are made directly, using only $l_1$ loss will not be sufficient. This is because $l_1$ loss will have different scales for small and large boxes even when their relative errors are similar. Hence a linear combination of $l_1$ and GIoU losses may be used for bounding box regression with $\lambda_{L1}=5$ and $\lambda_{iou}=2$ weights respectively. N may be set to N=25 decoder query slots. To find a bipartite matching between the predicted set and ground-truth boxes, the Hungarian algorithm may be used to compute the optimal assignment. The matching cost takes into account both the class prediction and the similarity of predicted and ground truth boxes. This is the key-enabler for getting rid of the non-max suppression procedure. It has been shown that the SPOT architecture performs significantly better relative to previous approaches and that SPOT is better able to generalize to unseen object categories.

Figure 7B:
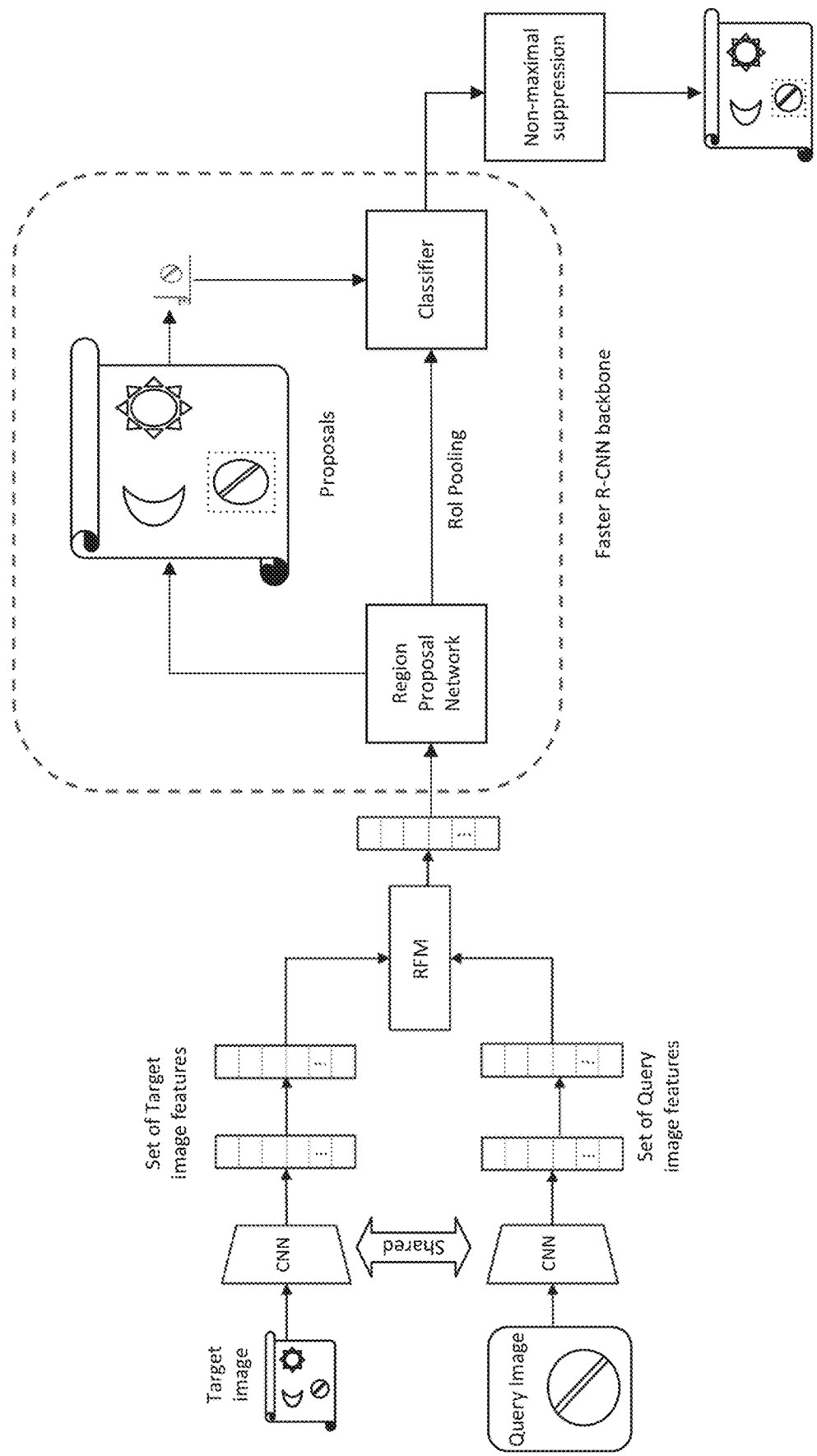
FIG. 7B is a diagram of another example architecture of the example-based object detection systems described herein, in accordance with various aspects of the present disclosure.

FIG. 7B is a diagram of another example architecture of the example-based object detection systems described herein, in accordance with various aspects of the present disclosure. While transformer-based end-to-end detection architectures (e.g., FIG. 7A) are one way to solve the example-based object detection and annotation problem, other object detector backbones may be used together with the RFM module as described above in reference to FIG. 7A, or a variant to emphasize target features based on query features. However, in some cases, end-to-end architectures may be advantageous since such architectures limit the prior information encoded in the model, which may be important for generalizing to unseen classes of objects. The example of FIG. 7B uses a region proposal network to detect the object-of-interest of the query image (e.g., the ball logo) in the target image.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of annotating images, comprising:
    receiving, by a first convolutional neural network (CNN), a query image representing a first depiction of an object-of-interest;
    generating, by the first CNN, first feature data representing the first depiction of the object-of-interest;
    receiving, by a second CNN a target image representing a scene in which a second depiction of the object-of-interest is visually represented, at least in part;
    generating, by the second CNN, second feature data representing the target image;
    determining, using the first feature data and the second feature data, an emphasized representation of the target image using the first feature data and the second feature data, the emphasized representation of the target image encoding a similarity between portions of the target image and the first depiction of the object-of-interest in the query image;
    inputting the emphasized representation of the target image into a transformer-based model;
    determining, by the transformer-based model using the emphasized representation of the target image and positional embeddings, a location of the second depiction of the object-of-interest in the target image;
    generating an annotated image comprising the target image with a bounding box surrounding a portion of the scene that includes the second depiction of the object-of-interest; and
    generating a label classifying the second depiction of the object-of-interest.

2. The computer-implemented method of claim 1, further comprising:
    causing the annotated image to be displayed on a graphical user interface (GUI) used for image data annotation;
    causing the query image to be displayed on the GUI;
    providing a first selectable control on the GUI to accept the annotated image as an accurate annotation;
    providing a second selectable control on the GUI to reject the annotated image as an accurate annotation; and
    providing a third selectable control on the GUI to modify at least one of a location of the bounding box or the label.

3. The computer-implemented method of claim 2, further comprising:
    receiving a selection of the first selectable control;
    incorporating the annotated image in a training data set; and
    training a class-specific object detector using the annotated image and the training data set.

4. A method, comprising:
    receiving, as a first input to a first machine learning model for a first annotation task, a query image comprising a first depiction of an object-of-interest, wherein the first machine learning model has not been trained to detect the object-of-interest;
    receiving, as a second input to the first machine learning model for the first annotation task, a target image representing a scene in which a second depiction of at least a portion of the object-of-interest is visually represented;
    generating, by the first machine learning model using the first input and the second input during the first annotation task, annotated output image data that identifies a location of the second depiction of at least the portion of the object-of-interest within the target image;
    receiving an input causing the annotated output image data to be stored in non-transitory computer-readable memory as part of a training data set for training an object detection model; and
    training the object detection model based at least in part on the annotated output image data.

5. The method of claim 4, wherein:
    the object-of-interest is a first class of object; and
    the first machine learning model is trained using a data set that does not include annotations related to the first class of object.

6. The method of claim 4, further comprising:
    generating, by a first convolutional neural network (CNN) of the first machine learning model, a first feature representation of the first depiction of the object-of-interest; and
    generating, by a second CNN of the first machine learning model, a second feature representation of the second depiction of at least the portion of the object-of-interest.

7. The method of claim 6, further comprising:
determining, using a feature mapping component of the first machine learning model, a similarity between the first feature representation and the second feature representation; and
generating the annotated output image data based at least in part on the similarity.

8. The method of claim 4, further comprising:
generating bounding box data that identifies the location of the second depiction of at least the portion of the object-of-interest within the target image; and
generating label data identifying a class of the object-of-interest, wherein the annotated output image data comprises the label data and the bounding box data.

9. The method of claim 4, further comprising:
generating segmentation mask data that identifies the location of the second depiction of at least the portion of the object-of-interest within the target image; and
generating label data identifying a class of the object-of-interest, wherein the annotated output image data comprises the label data and the segmentation mask data.

10. The method of claim 4, further comprising:
providing the annotated output image data via a first graphical user interface (GUI);
providing, via the GUI, a first option to accept the annotated output image data as an accurate annotation for the object-of-interest; and
providing, via the GUI, a second option to modify a bounding box or segmentation mask defining a location of the second depiction of at least the portion of the object-of-interest in the target image.

11. The method of claim 4, further comprising:
receiving, by the first machine learning model, a second query image comprising a logo or pictogram;
receiving, by the first machine learning model, a second target image representing a second scene;
determining, by the first machine learning model that an instance of the logo or the pictogram are present in the second target image; and
generating second annotated output image data that identifies the location of the instance of the logo or the pictogram within the second target image.

12. The method of claim 4, wherein the second depiction of at least the portion of the object-of-interest is deformed, rotated, scaled, and/or incomplete with respect to the first depiction of the object-of-interest.

13. A system comprising:
at least one processor; and
non-transitory computer-readable memory storing instructions that, when executed by the at least one processor, are effective to:
receive, as a first input to a first machine learning model for a first annotation task, a query image comprising a first depiction of an object-of-interest, wherein the first machine learning model has not been trained to detect the object-of-interest;
receive, as a second input to the first machine learning model for the first annotation task, a target image representing a scene in which a second depiction of at least a portion of the object-of-interest is visually represented;
generate, by the first machine learning model using the first input and the second input during the first annotation task, annotated output image data that identifies a location of the second depiction of at least the portion of the object-of-interest within the target image;
receive an input causing the annotated output image data to be stored in the non-transitory computer-readable memory as part of a training data set for training an object detection model; and
train the object detection model based at least in part on the annotated output image data.

14. The system of claim 13, wherein:
the object-of-interest is a first class of object; and
the first machine learning model is trained using a data set that does not include annotations related to the first class of object.

15. The system of claim 13, the non-transitory computer-readable memory storing further instructions that, when executed by the at least one processor, are further effective to:
generate, by a first convolutional neural network (CNN) of the first machine learning model, a first feature representation of the first depiction of the object-of-interest; and
generate, by a second CNN of the first machine learning model, a second feature representation of the second depiction of at least the portion of the object-of-interest.

16. The system of claim 15, the non-transitory computer-readable memory storing further instructions that, when executed by the at least one processor, are further effective to:
determine, using a feature mapping component of the first machine learning model, a similarity between the first feature representation and the second feature representation; and
generate the annotated output image data based at least in part on the similarity.

17. The system of claim 13, the non-transitory computer-readable memory storing further instructions that, when executed by the at least one processor, are further effective to:
generate bounding box data that identifies the location of the second depiction of at least the portion of the object-of-interest within the target image; and
generate label data identifying a class of the object-of-interest, wherein the annotated output image data comprises the label data and the bounding box data.

18. The system of claim 13, the non-transitory computer-readable memory storing further instructions that, when executed by the at least one processor, are further effective to:
generate segmentation mask data that identifies the location of the second depiction of at least the portion of the object-of-interest within the target image; and
generate label data identifying a class of the object-of-interest, wherein the annotated output image data comprises the label data and the segmentation mask data.

19. The system of claim 13, the non-transitory computer-readable memory storing further instructions that, when executed by the at least one processor, are further effective to:
provide the annotated output image data via a first graphical user interface (GUI);
provide, via the GUI, a first option to accept the annotated output image data as an accurate annotation for the object-of-interest; and
provide, via the GUI, a second option to modify a bounding box or segmentation mask defining a location of the second depiction of at least the portion of the object-of-interest in the target image.

20. The system of claim 13, the non-transitory computer-readable memory storing further instructions that, when executed by the at least one processor, are further effective to:
- receive, by the first machine learning model, a second query image comprising a logo or pictogram;
- receive, by the first machine learning model, a second target image representing a second scene;
- determine, by the first machine learning model that an instance of the logo or the pictogram are present in the second target image; and
- generate second annotated output image data that identifies the location of the instance of the logo or the pictogram within the second target image.

\* \* \* \* \*